(12) United States Patent
Asmussen et al.

(10) Patent No.: US 9,991,066 B2
(45) Date of Patent: Jun. 5, 2018

(54) SYNCHRONIZING SWITCHING TIMES OF RELAYS TO A ZERO-CROSSING

(71) Applicant: Honeywell International Inc., Morristown, NJ (US)

(72) Inventors: Michael Asmussen, New London, CT (US); Philipp Anton Roosli, Niantic, CT (US)

(73) Assignee: Honeywell International Inc., Morris Plains, NJ (US)

( * ) Notice: Subject to any disclaimer, the term of this patent is extended or adjusted under 35 U.S.C. 154(b) by 333 days.

(21) Appl. No.: 14/992,730

(22) Filed: Jan. 11, 2016

(65) Prior Publication Data
US 2017/0200578 A1 Jul. 13, 2017

(51) Int. Cl.
| | |
|---|---|
| *H01H 9/56* | (2006.01) |
| *H01H 47/18* | (2006.01) |
| *H02H 7/26* | (2006.01) |
| *H01H 47/20* | (2006.01) |

(52) U.S. Cl.
CPC .............. *H01H 9/56* (2013.01); *H01H 47/18* (2013.01); *H01H 47/20* (2013.01); *H02H 7/263* (2013.01)

(58) Field of Classification Search
CPC .......... H01H 47/18; H01H 47/20; H01H 9/56; H01H 9/563; H02H 7/26–7/263
See application file for complete search history.

(56) References Cited

U.S. PATENT DOCUMENTS

| | | | |
|---|---|---|---|
| 3,443,204 A | 5/1969 | Baker | |
| 4,626,698 A * | 12/1986 | Harnden, Jr. | ............ H01H 9/56 307/35 |
| 5,761,083 A * | 6/1998 | Brown, Jr. | ......... G05B 19/0421 340/12.53 |
| 5,838,077 A * | 11/1998 | Chelcun | ................... H01H 9/56 307/125 |
| 6,031,340 A * | 2/2000 | Brosius | ................. H05B 41/42 315/227 R |
| 6,493,203 B1 * | 12/2002 | Ito | .......................... H01H 9/563 361/159 |
| 8,081,649 B2 | 12/2011 | Cregg et al. | |
| 8,385,038 B2 * | 2/2013 | Saito | ....................... H01H 9/56 361/115 |
| 2001/0006549 A1 * | 7/2001 | Harasaki | ............... H04M 3/005 379/373.03 |

(Continued)

OTHER PUBLICATIONS

International Search Report from related PCT Application No. PCT/US2017/013014, dated Apr. 25, 2017, 11 pages.

*Primary Examiner* — Thienvu Tran
*Assistant Examiner* — Christopher Clark
(74) *Attorney, Agent, or Firm* — Brooks, Cameron & Huebsch, PLLC

(57) ABSTRACT

Methods, devices, and systems for synchronizing switching times of relays to a zero-crossing are described herein. One device includes a memory, and a processor configured to execute executable instructions stored in the memory to receive phase information of an alternating-current (AC) electric mains, determine, from the phase information, a zero-crossing of the phase of the AC electric mains, determine a reference time based on the zero-crossing for a number of relays corresponding to a number of relay controllers, and transmit the reference time to the number of relay controllers.

20 Claims, 3 Drawing Sheets

(56) References Cited

U.S. PATENT DOCUMENTS

| | | | | |
|---|---|---|---|---|
| 2008/0116877 A1* | 5/2008 | Giubbini | ............... | G01R 29/18 |
| | | | | 324/84 |
| 2009/0027824 A1* | 1/2009 | Allen | ..................... | H01H 9/56 |
| | | | | 361/170 |
| 2009/0103228 A1* | 4/2009 | Elderbaum | ............ | H01H 9/167 |
| | | | | 361/187 |
| 2009/0125124 A1* | 5/2009 | Premerlani | .......... | G05B 19/054 |
| | | | | 700/18 |
| 2009/0189612 A1* | 7/2009 | Mills | ................... | H01H 71/128 |
| | | | | 324/424 |
| 2010/0254060 A1* | 10/2010 | Saito | ..................... | H01H 9/56 |
| | | | | 361/115 |
| 2011/0141647 A1* | 6/2011 | Garcia | ................ | H01H 23/145 |
| | | | | 361/166 |
| 2011/0254525 A1* | 10/2011 | Gaknoki | ............ | H05B 33/0815 |
| | | | | 323/283 |
| 2012/0091915 A1* | 4/2012 | Ilyes | ................. | H05B 37/0263 |
| | | | | 315/307 |
| 2013/0101003 A1* | 4/2013 | Vedantham | ............. | H04B 3/54 |
| | | | | 375/224 |
| 2013/0231793 A1* | 9/2013 | Elliott | ................... | G05B 15/02 |
| | | | | 700/292 |
| 2014/0340236 A1 | 11/2014 | Rhoads et al. | | |
| 2015/0098164 A1 | 4/2015 | Lenig et al. | | |
| 2015/0137865 A1* | 5/2015 | Tohzaka | ................... | H03L 7/06 |
| | | | | 327/163 |
| 2016/0308349 A1* | 10/2016 | Sridharan | ............... | H02H 7/26 |
| 2016/0380477 A1* | 12/2016 | Mitsui | ................... | H02J 9/062 |
| | | | | 307/65 |

* cited by examiner

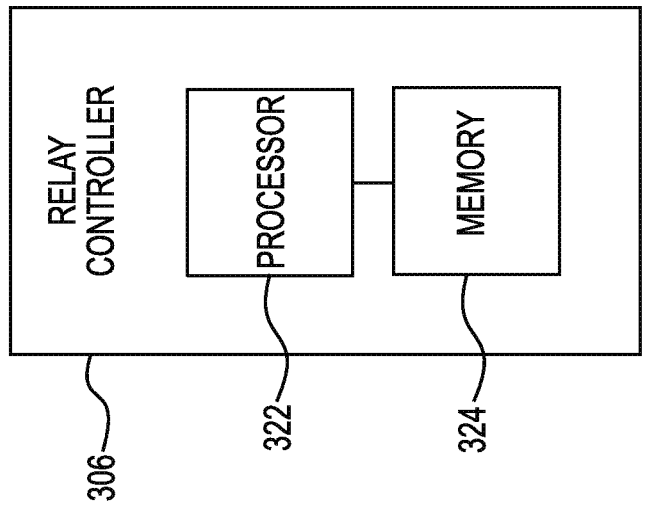
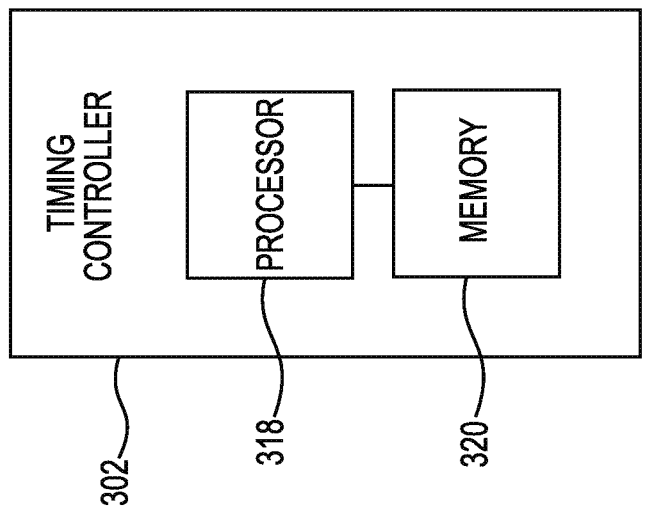
Fig. 3

US 9,991,066 B2

SYNCHRONIZING SWITCHING TIMES OF RELAYS TO A ZERO-CROSSING

TECHNICAL FIELD

The present disclosure relates to methods, devices, and systems for synchronizing switching times of relays to a zero-crossing.

BACKGROUND

In systems using alternating-current (AC) power to power equipment, switching a relay of a device when the AC voltage is at a high and/or peak voltage relative to a low voltage or zero-crossing of the AC voltage can damage the relay and/or the device. For example, when switching a light emitting diode (LED) by a relay, the LED can experience an inrush current while charging capacitors due to a low resistance during initial start-up of the LED. The inrush current, if high enough, can fuse contacts of the relay operating the LED.

Life expectancy of a device operated by a relay can be lowered when exposed to large inrush currents. As a result, long term quality of equipment operated by these relays can suffer, which may result in unintended expenditures to replace damaged equipment. Further, reputation of equipment operated by relays experiencing large inrush currents can be reduced due to shorter life expectancy of the equipment than intended.

BRIEF DESCRIPTION OF THE DRAWINGS

FIG. 3 is a schematic block diagram of a timing controller and a relay controller for synchronizing switching times of relays to a zero-crossing, in accordance with one or more embodiments of the present disclosure.

DETAILED DESCRIPTION

Methods, devices, and systems for synchronizing switching times of relays to a zero-crossing are described herein. For example, one or more embodiments include a memory, and a processor configured to execute executable instructions stored in the memory to receive phase information of an alternating-current (AC) electric mains, determine from the phase information a zero-crossing of the phase of the AC electric mains, determine a reference time based on the zero-crossing for a number of relays corresponding to a number of relay controllers, and transmit the reference time to the number of relay controllers.

Synchronizing a switching time for a relay to a zero-crossing can help improve the life expectancy of equipment by lowering inrush currents experienced by the relay. However, a system operating many different devices may need to synchronize many different controllers to the zero-crossing of an AC electric mains. For example, each controller of the system may need to be connected to the AC electric mains in order to sense the timing of the zero-crossing.

Connecting each controller of the system to the AC electric mains may require additional equipment, connections, and wiring. Further, the additional equipment, connections, and wiring can require more space that may not be available. Additionally, the further equipment, connections, and wiring may require approval and/or certification from a government and/or certification group. Therefore, connecting each controller of the system to the AC mains can result in high costs to a building owner and/or operator.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

Figure 1:
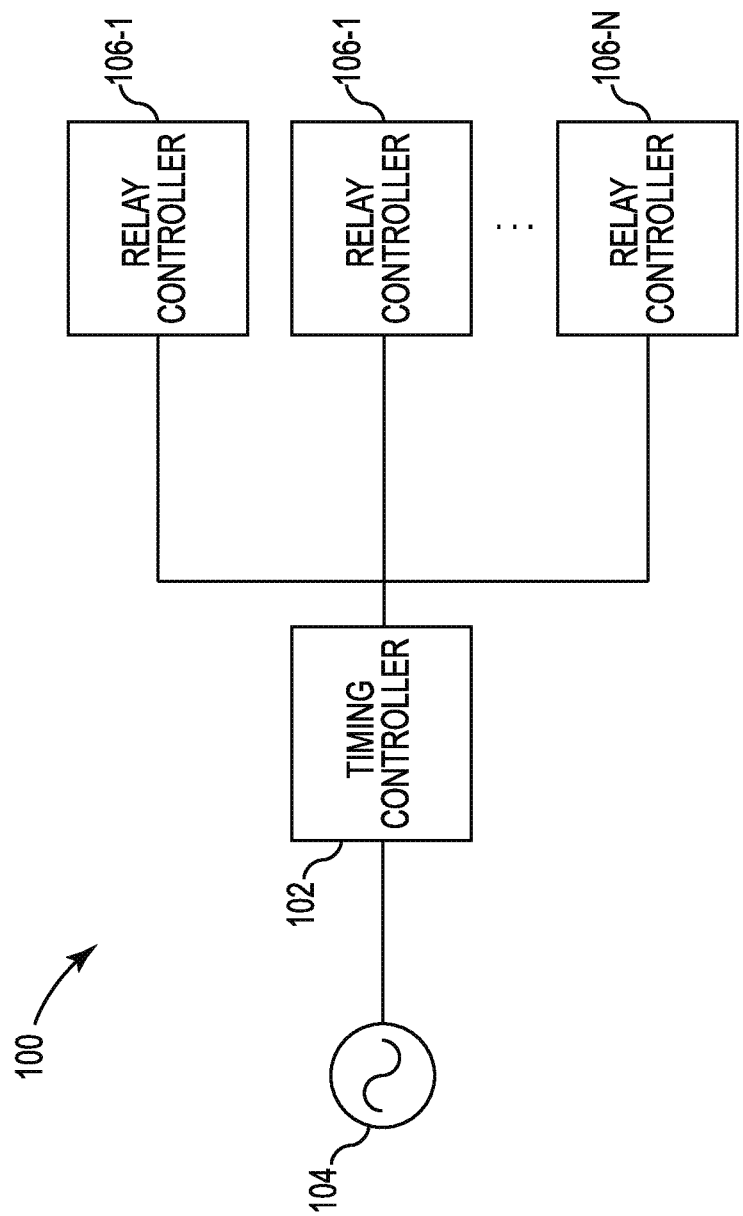
FIG. 1 illustrates a system for synchronizing switching times of relays to a zero-crossing, in accordance with one or more embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, controller 102 as shown in FIG. 1 can be controller 302, as shown in FIG. 3. Additionally, the designator "N", as used herein, particularly with respect to reference numerals in the drawings, indicates that a number of the particular feature so designated can be included with a number of embodiments of the present disclosure.

As used herein, "a" or "a number of" something can refer to one or more such things. For example, "a number of relay controllers" can refer to one or more relay controllers.

FIG. 1 illustrates a system for synchronizing switching times of relays to a zero-crossing, in accordance with one or more embodiments of the present disclosure. As shown in FIG. 1, system 100 can include a timing controller 102, alternating-current (AC) electric mains 104, and relay controllers 106-1, 106-2, 106-N.

Timing controller 102 can receive phase information from AC electric mains 104. As used herein, phase information can refer to a position of a point in time on a waveform cycle. A waveform cycle of an AC electric mains can be represented by, for example, a sine wave of a voltage varying with time in an AC electric mains.

Timing controller 102 can be connected to AC electric mains 104. For example, AC electric mains 104 may be powering systems of a building. Timing controller 102 can be part of a system of the building, and be connected to AC electric mains 104.

Timing controller 102 can sense the voltage of AC electric mains 104. For example, timing controller 102 can utilize an AC voltage detection circuit to determine the voltage of AC electric mains 104.

Timing controller 102 can determine, from the phase information, a zero-crossing of the phase of AC electric mains 104. For example, timing controller 102 can utilize the phase information to determine the point at which the phase of AC electric mains 104 is at a zero-crossing. As used herein, a zero-crossing can be a point where the sign of a mathematical function (e.g., a sine wave) changes from positive to negative, represented by a crossing of an axis (e.g., a zero-value) on the graph of the function.

The zero-crossing can be determined when the phase of AC electric mains 104 is at a zero voltage. For example, the zero-crossing of AC electric mains 104 can be determined when a sine wave representing the phase of AC electric mains 104 crosses an axis on the graph of the sine wave. The point of crossing of the axis of the sine wave representing the phase of AC electric mains 104 can correspond to a zero-voltage of AC electric mains 104.

Timing controller 102 can determine a reference time based on the sensed zero-crossing of AC electric mains 104. The reference time can be determined to correspond to the zero-crossing of AC electric mains 104. For example, the reference time can correspond to a time at which the sine wave representing the phase of AC electric mains 104 crosses the axis in the graph of the sine wave.

Timing controller 102 can transmit the reference time to a number of relay controllers 106-1, 106-2, 106-N. For example, timing controller 102 can transmit the reference time to relay controllers 106-1, 106-2, and 106-N. As used herein, a relay can be an electrically operated switch.

The reference time can be transmitted from timing controller 102 to relay controllers 106-1, 106-2, and 106-N via a network relationship. For example, the reference time can be transmitted from timing controller 102 to relay controllers 106-1, 106-2, and 106-N via a wired or wireless network.

The wired or wireless network can be a network relationship that connects relay controllers 106-1, 106-2, 106-N to timing controller 102. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, and/or the Internet, among other types of network relationships. The network relationship can be a packet-switching network, although embodiments of the present disclosure are not so limited. As used herein, a packet-switching network can transmit packets via a transmission medium that may be shared by multiple simultaneous communication sessions.

Timing controller 102 can transmit the reference time to relay controllers 106-1, 106-2, 106-N via a preexisting network relationship. For example, timing controller 102 can utilize a network relationship that may already exist in a system. That is, timing controller 102 does not need a separate, dedicated network to transmit the reference time to relay controllers 106-1, 106-2, 106-N, and can transmit the reference time using the preexisting network relationship that may be being utilized by other simultaneous communication sessions.

Timing controller 102 and relay controllers 106-1, 106-2, 106-N can be part of the same AC grid. That is, timing controller 102 and relay controllers 106-1, 106-2, 106-N can be part of the same interconnected AC network. Timing controller 102 and relay controllers 106-1, 106-2, 106-N being on the same AC grid can ensure timing controller 102 is in phase with relay controllers 106-1, 106-2, 106-N.

Timing controller 102 can transmit the reference time to relay controllers 106-1, 106-2, 106-N at a predefined time. For example, timing controller 102 can transmit the reference time to relay controllers 106-1, 106-2, 106-N two milliseconds after every zero-crossing. Transmitting the reference time at a predefined time, such as two milliseconds after every zero-crossing, can allow for relay controllers 106-1, 106-2, 106-N to determine exactly when the next zero-crossing takes place, as will be further described herein.

The predefined time for transmission of the reference time to relay controllers 106-1, 106-2, 106-N can be determined to allow for a delay to allow time synchronization of timing controller 102 and relay controllers 106-1, 106-2, 106-N. For example, the delay can allow for distributed time synchronization of timing controller 102 and relay controllers 106-1, 106-2, 106-N. The distributed time synchronization can be accomplished by network time protocol (NTP) or simple network time protocol (SNTP), although embodiments of the present disclosure are not limited to NTP or SNTP for distributed time synchronization.

Although the predefined time is described as two milliseconds after every zero-crossing, embodiments of the present disclosure are not so limited. For example, the predefined time can be less than two milliseconds after every zero-crossing, such as every one millisecond. As a further example, the predefined time can be more than two milliseconds after every zero-crossing, such as every three milliseconds.

The reference time can be transmitted from timing controller 102 to relay controllers 106-1, 106-2, and 106-N by a number of packets. As used herein, a packet can be a network packet, where a network packet is a formatted unit of data carried by a packet-switching network.

The number of packets transmitted from timing controller 102 to relay controllers 106-1, 106-2, 106-N can include a packet identifier and a packet time stamp. A packet identifier can include data that identifies the packet transmission to relay controllers 106-1, 106-2, 106-N. For example, the packet identifier can identify to relay controllers 106-1, 106-2, 106-N that the incoming packet from controller 102 includes timing information (e.g., synchronization information).

A packet time stamp can include timing information to allow relay controllers 106-1, 106-2, 106-N to determine when the next zero-crossing of AC electric mains 104 takes place. Timing information can include the reference time, as well as the frequency of AC electric mains 104.

The zero-crossing can depend on the frequency of AC electric mains 104. For example, at a 60 Hertz (Hz) frequency of AC electric mains 104, the zero-crossing can occur around every eight milliseconds. As a further example, at a 50 Hz frequency of AC electric mains 104, the zero-crossing can occur around every ten milliseconds.

Using the reference time (e.g., the time of the zero-crossing), the predefined time (e.g., two milliseconds after the zero-crossing), and the frequency of AC electric mains 104, relay controllers 106-1, 106-2, 106-N can determine when the next zero-crossing takes place. Determination of the next zero-crossing of AC electric mains 104 can allow for relay controllers 106-1, 106-2, 106-N to switch relay contacts at a zero-crossing, as will be further described herein.

Relay controllers 106-1, 106-2, 106-N can receive the reference time from timing controller 102. As previously described, relay controllers 106-1, 106-2, and 106-N can receive the reference time from timing controller 102 via a network relationship that can include a packet-switching network, although embodiments of the present disclosure are not so limited to a packet-switching network.

Relay controllers 106-1, 106-2, 106-N are not connected to AC electric mains 104. For example, AC electric mains 104 may be powering various systems included in a building. Relay controllers 106-1, 106-2, 106-N can be part of a system of the building, but not be directly connected to AC electric mains 104.

Relay controllers 106-1, 106-2, 106-N can use the reference time to determine a next zero-crossing based on the predefined transmission time of timing controller 102. Using the reference time (e.g., the time of the zero-crossing), the predefined time (e.g., two milliseconds after the zero-crossing), and the frequency of AC electric mains 104, relay controllers 106-1, 106-2, 106-N can determine a next zero-crossing. That is, relay controllers 106-1, 106-2, 106-N can utilize the frequency of AC electric mains 104, and determine a time after receiving the number of packets to determine a next zero-crossing.

Relay controllers 106-1, 106-2, 106-N can switch relay contacts of a number of relays corresponding to relay controllers 106-1, 106-2, 106-N based on the reference time. For example, based on the reference time, relay controllers 106-1, 106-2, 106-N can determine the next zero-crossing of AC electric mains 104. Relays controlled by relay controllers 106-1, 106-2, 106-N can then be switched at the time of the zero-crossing.

Relay controllers 106-1, 106-2, 106-N can switch relay contacts at the zero-crossing for resistive loads. A resistive load, as used herein, can refer to a load which consumes electrical energy in a sinusoidal manner, where there is no phase difference between the current and the voltage of AC electric mains 104 (e.g., current is in time with and directly proportional to the voltage). For example, in a resistive load (e.g., no inductance or capacitance), relay controllers 106-1, 106-2, 106-N can switch relay contacts at the point of the zero-crossing of AC electric mains 104.

Relay controllers 106-1, 106-2, 106-N can switch relay contacts when a phase angle of a sine wave of AC electric mains 104 is at 90 degrees for inductive loads. An inductive load, as used herein, can refer to a load that experiences an inrush current when first energized, where there is a 90 degree phase difference between the current and the voltage (e.g., current reaches a peak 90 degrees (1/4 cycle) before the voltage reaches its peak). For example, in an inductive load, relay controllers 106-1, 106-2, 106-N can switch relay contacts when a phase angle of a sine wave of AC electric mains 104 is at 90 degrees in order to avoid excessive loads (e.g., inrush currents) when switched.

Relay controllers 106-1, 106-2, 106-N can switch relay contacts when a phase angle of a sine wave of AC electric mains 104 is at 90 degrees for capacitive loads. A capacitive load, as used herein, can refer to a load that experiences an inrush current when first energized, where there is a 90 degree phase difference between the current and the voltage (e.g., current reaches a peak 90 degrees (1/4 cycle) before the voltage reaches its peak). For example, in a capacitive load, relay controllers 106-1, 106-2, 106-N can switch relay contacts when a phase angle of a sine wave of AC electric mains 104 is at 90 degrees in order to avoid excessive loads (e.g., inrush currents) when switched.

Switching the relay contacts of the number of relays by relay controllers 106-1, 106-2, 106-N can include switching the relay contacts open when a current across the relay contacts is less than a threshold current. A threshold current can be, for example, a current that is higher than a minimum current such that the relay contacts are switched open when the current across the relay contacts is at the minimum current. For example, switching the relay contacts open can include opening (e.g., breaking) a circuit when the current across the relay contacts is at a minimum or smallest current. That is, relay contacts can be switched open when a current across the relay contacts is below the threshold current, such as when the current is at a minimum current. For any load with a known phase angle, the relay contact can be timed to be opened when the current through the relay contacts is at a minimum.

Switching the relay contacts of the number of relays by relay controllers 106-1, 106-2, 106-N can include switching the relay contacts closed when a voltage across the relay contacts is less than a threshold voltage. A threshold voltage can be, for example, a voltage that is higher than a minimum voltage such that the relay contacts are switched closed when the voltage across the relay contacts is at the minimum voltage. For example, switching the relay contacts closed can include closing (e.g., completing) a circuit when the voltage across the relay contacts is at a minimum or smallest voltage. That is, relay contacts can be switched closed when a voltage across the relay contacts is below the threshold voltage, such as when the voltage is at a minimum voltage.

Synchronizing switching times of relays to a zero-crossing, in accordance with the present disclosure, can allow for a timing controller connected to an AC electric mains to synchronize a number of relay controllers to a zero-crossing of the AC electric mains. Switching relays at the zero-crossing of the AC electric mains can help avoid inrush currents that may damage relay contacts. Connecting the timing controller to the AC electric mains, while not connecting the relay controllers to the AC electric mains, can save on equipment and certification costs. Additionally, avoiding inrush currents can help extend life expectancy of equipment.

Figure 2:
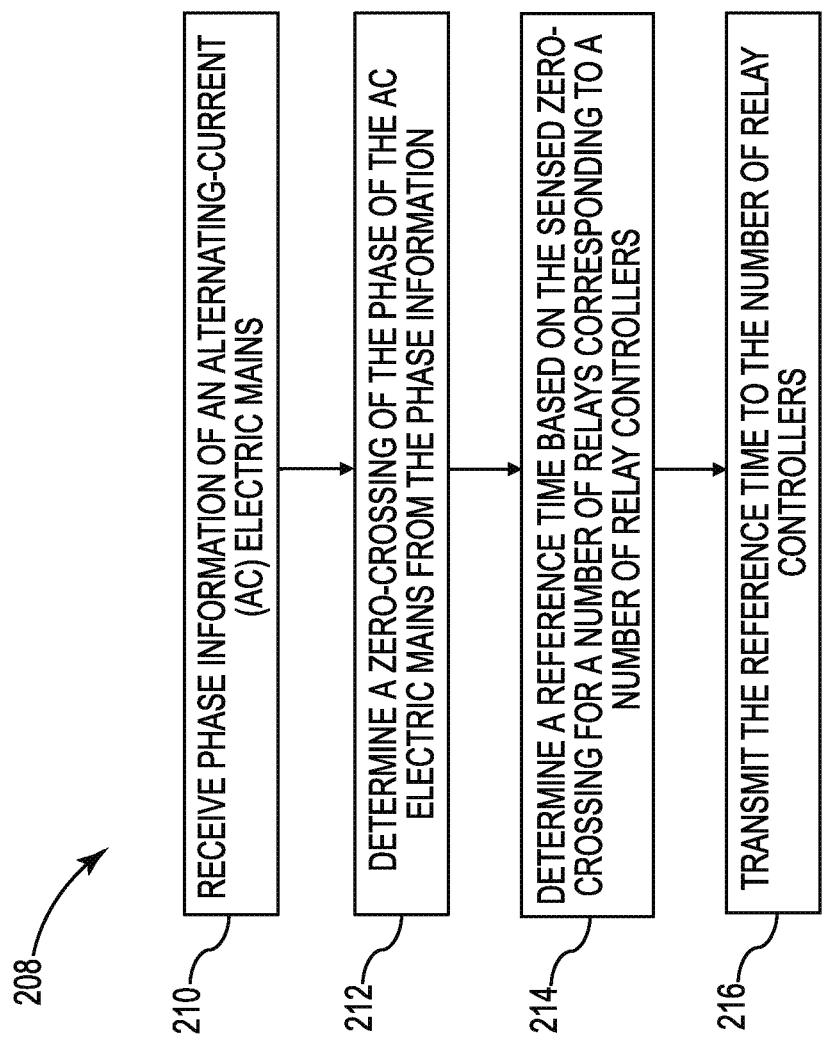
FIG. 2 is a flow chart of a method for synchronizing switching times of relays to a zero-crossing, in accordance with one or more embodiments of the present disclosure.

FIG. 2 is a flow chart of a method for synchronizing switching times of relays to a zero-crossing, in accordance with one or more embodiments of the present disclosure. Method 208 can be performed by, for example, controllers 102, 106-1, 106-2, 106-N, 302, and 306, described in connection with FIGS. 1, and 3, respectively.

At 210, the method 208 can include receiving phase information of an alternating-current (AC) electric mains. Phase information can be received from an AC electric mains (e.g., AC electric mains 104, previously described in connection with FIG. 1), and can include information relating to a position of a point in time on a waveform cycle represented by a sine wave. The sine wave can represent a voltage of the AC electric mains, which can be varying with time.

At 212, the method 208 can include determining a zero-crossing of the phase of the AC electric mains from the phase information. The zero-crossing of the phase of the AC electric mains can correspond to the point at which the sine wave representing the voltage of the AC electric mains crosses an axis in a graph of the sine wave. The point at which the sine wave crosses the axis of the graph can correspond to a zero-voltage of the AC electric mains.

At 214, the method 208 can include determining a reference time based on the sensed zero-crossing for a number of relays corresponding to a number of relay controllers. A reference time can correspond to the time at which the sine wave representing the voltage of the AC electric mains crosses the axis of the graph of the sine wave. That is, the reference time can correspond to the zero-crossing of the voltage of the AC electric mains.

At 216, the method 208 can include transmitting the reference time to the number of relay controllers. For example, the reference time corresponding to the zero-crossing of the voltage of the AC electric mains can be transmitted to a number of relay controllers (e.g., relay controllers 106-1, 106-2, 106-N, previously described in connection with FIG. 1). The number of relay controllers can use the reference time, a predefined transmission time, as well as the frequency of the AC electric mains to determine the next zero-crossing of the AC electric mains, and can switch relay contacts at the next zero-crossing.

The method can be repeated at a specified frequency. For example, the method can include receiving phase information of an AC electric mains, determining a zero-crossing of the AC electric mains, determining a reference time based on the zero-crossing, and transmitting the reference time to a number of relay controllers every three to five seconds. Due to short-term fluctuations of the AC electric mains, repeating the method every three to five seconds can allow for the number of relay controllers to continue to switch relay contacts at or near the zero-crossing of the AC electric mains to avoid inrush currents that can damage the relays and/or relay contacts.

The specified frequency of the method can be configurable. For example, synchronizing switching times of relays to the zero-crossing by method 208 can be repeated at a frequency faster than three seconds (e.g., method 208 can be repeated more than every three seconds). As another example, synchronizing switching times of relays to the zero-crossing by method 208 can be repeated at a frequency slower than three seconds (e.g., method 208 can be repeated less than every three seconds).

The method can further include sensing variations in the AC electric mains. For example, a short-term fluctuation in the frequency of the AC electric mains can be sensed. Short-term fluctuations of the AC electric mains can change the timing of the zero-crossing. Therefore, the method can include receiving fluctuated phase information of an AC electric mains, determining a new zero-crossing of the AC electric mains, determining a new reference time based on the zero-crossing, and transmitting the reference time to a number of relay controllers based on the new zero-crossing.

The method can further include varying a transmission time based on the variations in the AC electric mains. For example, a reference time can be transmitted more often based on a variation in the AC electric mains causing a higher frequency of the AC electric mains. That is, method 208 can be repeated at a higher frequency when a variation in the AC electric mains causes a zero-crossing of the AC electric mains to occur more frequently. Additionally, method 208 can be repeated at a lower frequency when a variation in the AC electric mains causes a zero-crossing of the AC electric mains to occur less frequently.

A timing controller (e.g., timing controller 102, as previously described in connection with FIG. 1) can include a precision reference timer to measure variations (e.g., phase shifts) of the AC electric mains. For example, the timing controller can include a crystal oscillator to measure phase shifts of the AC electric mains, although embodiments of the present disclosure are not limited to crystal oscillators.

FIG. 3 is a schematic block diagram of a timing controller and a relay controller for synchronizing switching times of relays to a zero-crossing, in accordance with one or more embodiments of the present disclosure. Timing controller 302 can be, for example, timing controller 102, previously described in connection with FIG. 1. Relay controller 306 can be, for example, relay controllers 106-1, 106-2, or 106-N, previously described in connection with FIG. 1.

Timing controller 302 can include a memory 320 and a processor 318 configured for synchronizing switching times of relays to a zero-crossing, in accordance with the present disclosure. Relay controller 306 can include a memory 324 and a processor 322 configured for synchronizing switching times of relays to a zero-crossing, in accordance with the present disclosure.

The memory 320, 324 can be any type of storage medium that can be accessed by the processor 318, 322 to perform various examples of the present disclosure. For example, the memory 320 can be a non-transitory computer readable medium having computer readable instructions (e.g., computer program instructions) stored thereon that are executable by the processor 318 to receive phase information of an AC electric mains, determine a zero-crossing of the phase of the AC electric mains, determine a reference time based on the sensed zero-crossing of the AC electric mains, and transmit the reference time to a number of relay controllers. Additionally, memory 324 can be a non-transitory computer readable medium having computer readable instructions (e.g., computer program instructions) stored thereon that are executable by the processor 322 to receive the reference time from timing controller, and switch relay contacts of a number of relays corresponding to the number of relay controllers based on the reference time.

The memory 320, 324 can be volatile or nonvolatile memory. The memory 320, 324 can also be removable (e.g., portable) memory, or non-removable (e.g., internal) memory. For example, the memory 320, 324 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 320 and 324 is illustrated as being located within controller 302 and 306, respectively, embodiments of the present disclosure are not so limited. For example, memory 320 and 324 can also be located internal to another computing resource (e.g., enabling computer readable instructions to be downloaded over the Internet or another wired or wireless connection).

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A timing controller for synchronizing switching times of relays to a zero-crossing, comprising:
   a memory;
   a processor configured to execute executable instructions stored in the memory to:
     receive phase information of an alternating-current (AC) electric mains;
     determine, from the phase information, a zero-crossing of the phase of the AC electric mains;
     determine a reference time based on the zero-crossing for a number of relays corresponding to a number of relay controllers; and
     transmit the reference time to the number of relay controllers.

2. The timing controller of claim 1, wherein the zero-crossing is determined when the phase of the AC electric mains is at a zero voltage.

3. The timing controller of claim 1, wherein the reference time is determined to correspond to the zero-crossing of the AC electric mains.

4. The timing controller of claim 1, wherein the timing controller is connected to the AC electric mains of a building.

5. The timing controller of claim 4, wherein the number of relay controllers are not connected to the AC electric mains of the building.

6. The timing controller of claim 1, wherein the reference time is transmitted to the number of relay controllers by a number of packets.

7. The timing controller of claim 6, wherein the number of packets include:
   a packet identifier; and
   a packet time stamp.

8. A system for synchronizing switching times of relays to a zero-crossing, comprising:
   a timing controller connected to an alternating-current (AC) electric mains of a building, configured to:
     receive phase information of the AC electric mains;
     determine, from the phase information, a zero-crossing of the phase of the AC electric mains;
     determine a reference time based on the determined zero-crossing of the AC electric mains; and
     transmit the reference time to a number of relay controllers;
   the number of relay controllers, each configured to:
     receive the reference time from the timing controller; and
     switch relay contacts of a number of relays corresponding to the number of relay controllers based on the reference time.

9. The system of claim 8, wherein the timing controller transmits the reference time to the number of relay controllers at a predefined time.

10. The system of claim 9, wherein the number of relay controllers use the reference time to determine a next zero-crossing based on the predefined transmission time of the timing controller.

11. The system of claim 8, wherein the relay contacts are switched at the zero-crossing for resistive loads.

12. The system of claim 8, wherein the relay contacts are switched when a phase angle of a sine wave of the AC electric mains is at 90 degrees for inductive loads.

13. The system of claim 8, wherein the relay contacts are switched when a phase angle of a sine wave of the AC electric mains is at 90 degrees for capacitive loads.

14. The system of claim 8, wherein the relay contacts of the number of relays are switched open when a current across the relay contacts is less than a threshold current.

15. The system of claim 8, wherein the relay contacts of the number of relays are switched closed when a voltage across the relay contacts is less than a threshold voltage.

16. A computer implemented method for synchronizing switching times of relays to a zero-crossing, comprising:
   receiving, by a timing controller, phase information of an alternating-current (AC) electric mains;
   determining, by the timing controller, a zero-crossing of the phase of the AC electric mains from the phase information;
   determining, by the timing controller, a reference time based on the determined zero-crossing for a number of relays corresponding to a number of relay controllers; and
   transmitting, by the timing controller, the reference time to the number of relay controllers.

17. The method of claim 16, wherein the method is repeated at a specified frequency.

18. The method of claim 17, wherein the specified frequency is configurable.

19. The method of claim 16, wherein the method further includes sensing variations in the AC electric mains.

20. The method of claim 19, wherein the method further includes varying a transmission time based on the variations in the AC electric mains.

* * * * *